US009658938B2

(12) United States Patent
Yoshida

(10) Patent No.: US 9,658,938 B2
(45) Date of Patent: May 23, 2017

(54) ITERATIVE TEST GENERATION BASED ON DATA SOURCE ANALYSIS

(71) Applicant: FUJITSU LIMITED, Kawasaki-shi, Kanagawa (JP)

(72) Inventor: Hiroaki Yoshida, Cupertino, CA (US)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/673,575

(22) Filed: Mar. 30, 2015

(65) Prior Publication Data
US 2016/0292064 A1 Oct. 6, 2016

(51) Int. Cl.
*G06F 9/44* (2006.01)
*G06F 11/36* (2006.01)

(52) U.S. Cl.
CPC ...... *G06F 11/3612* (2013.01); *G06F 11/3684* (2013.01); *G06F 11/3688* (2013.01)

(58) Field of Classification Search
CPC ............. G06F 11/3612; G06F 11/3684; G06F 11/3688
USPC .......................................................... 717/126
See application file for complete search history.

(56) References Cited

U.S. PATENT DOCUMENTS

| | | | | |
|---|---|---|---|---|
| 5,357,452 A * | 10/1994 | Pio-di-Savoia | ..... | G06F 11/3684 702/108 |
| 6,247,010 B1 * | 6/2001 | Doi | .................. | G06F 17/30699 709/203 |
| 6,697,961 B1 * | 2/2004 | Petrenko | ............. | G06F 11/3684 714/26 |
| 7,146,409 B1 * | 12/2006 | Bushee | ............. | G06F 17/30864 707/999.003 |
| 7,240,045 B1 * | 7/2007 | Bushee | ............. | G06F 17/30864 709/219 |
| 7,249,122 B1 * | 7/2007 | Bushee | ............. | G06F 17/30864 709/219 |
| 7,581,170 B2 * | 8/2009 | Baumgartner | .... | G06F 17/30911 715/234 |
| 7,908,260 B1 * | 3/2011 | Bushee | ............. | G06F 17/30867 704/9 |
| 2002/0174405 A1 * | 11/2002 | Janssen | ................. | G06F 17/504 716/106 |
| 2006/0224579 A1 * | 10/2006 | Zheng | ............... | G06F 17/30864 707/999.005 |

(Continued)

OTHER PUBLICATIONS

Bryant, Randal E., "Graph-Based Algorithms for Boolean Function Manipulation", IEEE, 1986, 15pg.*

(Continued)

*Primary Examiner* — Ryan Coyer
(74) *Attorney, Agent, or Firm* — Maschoff Brennan

(57) ABSTRACT

A method of testing a software program may include generating a test driver by assigning concrete values to input variables of a software program. The method may also include assigning symbolic source set elements to the input variables of the software program to generate a data structure based on the symbolic source set elements. The method may also include symbolically executing a current instruction of the software program based on the concrete values and symbolic source set elements assigned to the input variables of the software program and performing data source analysis on the current instruction of the software program based on symbolic execution of the current instruction.

19 Claims, 8 Drawing Sheets

(56) References Cited

U.S. PATENT DOCUMENTS

| | | | |
|---|---|---|---|
| 2012/0084759 A1* | 4/2012 | Candea | G06F 11/3612 |
| | | | 717/126 |
| 2013/0091495 A1* | 4/2013 | Garg | G06F 11/3684 |
| | | | 717/131 |
| 2014/0282419 A1 | 9/2014 | Yoshida et al. | |

OTHER PUBLICATIONS

T. Ball et al., "Bebop: a path-sensitive interprocedural dataflow engine," ACM SIGPLAN-SIGSOFT PASTE 01, Jun. 18-19, 2001.
M. Berndl et al., "Points-to analysis using BDDs," ACM SIGPLAN PLDI '03. Jun. 9-11, 2003.
J. Whaley et al., "Cloning-Based Context-Sensitive Pointer Alias Analysis Using Binary Decision Diagrams," ACM SIGPLAN PLDI '04. Jun. 9-11, 2004.
X. Zhang et al., "Efficient Forward Computation of Dynamic Slices Using Reduced Ordered Binary Decision Diagrams" ICSE '04 Proceedings of the 26th International Conference on Software Engineering pp. 502-511, 2004.
S. B. Akers, "Binary Decision Diagrams", IEEE Transactions on Computers archive vol. 27 Issue 6, Jun. 1978 pp. 509-516.
R. E. Bryant, "Graph based algorithms for Boolean function manipulation", IEEE Transactions on Computers, vol. 35, No. 8, Aug. 1986, pp. 677-691.

\* cited by examiner

```
120
121 void test_1() {
122     int x, y, z;
123     x = 0;
124     y = 0;
125     z = 0;
126     function_under_test(x, y, z);
127 }

130
131 void test_2() {
132     int x, y, z;
133     REGISTER_SYMBOLIC(x);
134     y = 0;
135     REGISTER_SYMBOLIC(z);
136     function_under_test(x, y, z);
137 }

140
141 void test_3() {
142     int x, y, z;
143     REGISTER_SYMBOLIC(x);
144     REGISTER_SYMBOLIC(y);
145     REGISTER_SYMBOLIC(z);
146     function_under_test(x, y, z);
147 }
```

```
100
101 int function_under_test(
102     int x,
103     int y,
104     int z)
105 {
106     int p = x * 2;
107     int q = p + y;
108     int r = p - z;
109     if (r == 1) return 1;
110     int a[4];
111     a[1] = q;
112     a[2] = r;
113     int t = a[1];
114     if (t == 2) return 2;
115     int u = a[x];
116     if (u != 3) return 3;
117     a[y] = q;
118     return 0;
119 }
```

FIG. 1

```
101 int function_under_test(
102     int x,
103     int y,
104     int z)
105 {
106     int p = x * 2;
107     int q = p + y;
108     int r = p - z;
109     if (r == 1) return 1;
110     int a[4];
111     a[1] = q;
112     a[2] = r;
113     int t = a[1];
114     if (t == 2) return 2;
115     int u = a[x];
116     if (u != 3) return 3;
117     a[y] = q;
118     return 0;
119 }
```

|   | Value | Source Set |
|---|---|---|
| x | x | $\{S_1\}$ |
| y | y | $\{S_2\}$ |
| z | z | $\{S_3\}$ |
| p | x*2 | $\{S_1\}$ |
| q | x*2+y | $\{S_1, S_2\}$ |
| r | x*2-z | $\{S_1, S_3\}$ |
| a | write(write(a, 1, x*2+y), 2, x*2-z) = $a_1$ | $\{\}$ |
|   |  | $\{S_1, S_2\}$ |
|   |  | $\{S_1, S_3\}$ |
| t | read($a_1$, 1) | $\{\}$ |
| u | read($a_1$, x) | $\{S_1, S_2\}$ |
| a | write(write(write(a, 1, x*2+y), 2, x*2-z), y, x*2+y) = $a_2$ | $\{S_1, S_2, S_3\}$ |
|   |  | $\{S_1, S_2, S_3\}$ |
|   |  | $\{S_1, S_2, S_3\}$ |
|   |  | $\{S_1, S_2, S_3\}$ |

FIG. 2

ITERATIVE TEST GENERATION BASED ON DATA SOURCE ANALYSIS

FIELD

The embodiments discussed herein are related to iterative test generation based on data source analysis.

BACKGROUND

As usage of electronic devices increases, so does the number of software programs run on these devices. Typically when a software program is developed, it is verified to help assure that the software program satisfies all of the predetermined requirements for the software program. Developing test cases to determine if a software program satisfies all predetermined requirements may be difficult and time consuming.

A software application may include any number of programs (e.g., classes, functions, procedures, subroutines, modules, or code blocks), and each program may be tested or validated individually. A program may be tested or validated manually or automatically. In the former case, a person (e.g., a software testing engineer) may manually design test cases for the program based on the design specification of the program, execute the program under the test cases, and check for program behavior or output that does not agree with the test cases. In the later case, a software-testing tool, implemented as computer software or hardware, may generate test cases for a program under test, execute the program under test while simulating the test cases, and check for program behavior or output that does not agree with the test cases. The sheer complexity of modern software often renders manual generation or design of test cases inadequate for completely testing the program.

A program may be formally tested and validated by assigning test input values to input variables of the program and the output values resulting from the input variables may be analyzed to determine the behavior and validate the program. Symbolic execution may be used to automatically generate test input values to be used for testing the program. For example, a software-testing tool may use symbolic execution to determine which inputs cause each part of the program to execute by utilizing symbolic values in place of concrete values to create symbolic expressions and constraints to identify possible outcomes for each conditional branch in the program.

Symbolic execution refers to the analysis of programs by tracking symbolic rather than actual values, as a case of abstract interpretation. It is a non-explicit state model checking technique that treats input to programs as symbol variables. It creates complex equations by executing finite paths in the program with symbolic variables and then solves the complex equations with a solver to obtain error scenarios, if any. In contrast to explicit state model checking, symbolic execution may, in some embodiments, be able to work out all possible input values and all possible use cases of all possible input values in the program under analysis. Thus, symbolic execution may exhaustively validate a program under analysis.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method may include generating a test driver by assigning concrete values to input variables of a software program. The method may also include assigning symbolic source set elements to the input variables of the software program to generate a data structure based on the symbolic source set elements. The method may also include symbolically executing a current instruction of the software program based on the concrete values and symbolic source set elements assigned to the input variables of the software program. The method may also include performing data source analysis on the current instruction of the software program based on symbolic execution of the current instruction to test whether the software program meets one or more predetermined requirements.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1 illustrates an example program under test and three versions of a test driver to test the example program;

FIG. 2 illustrates the example program of FIG. 1 and a corresponding data structure that includes source sets associated with input and program variables;

DESCRIPTION OF EMBODIMENTS

Figure 3:
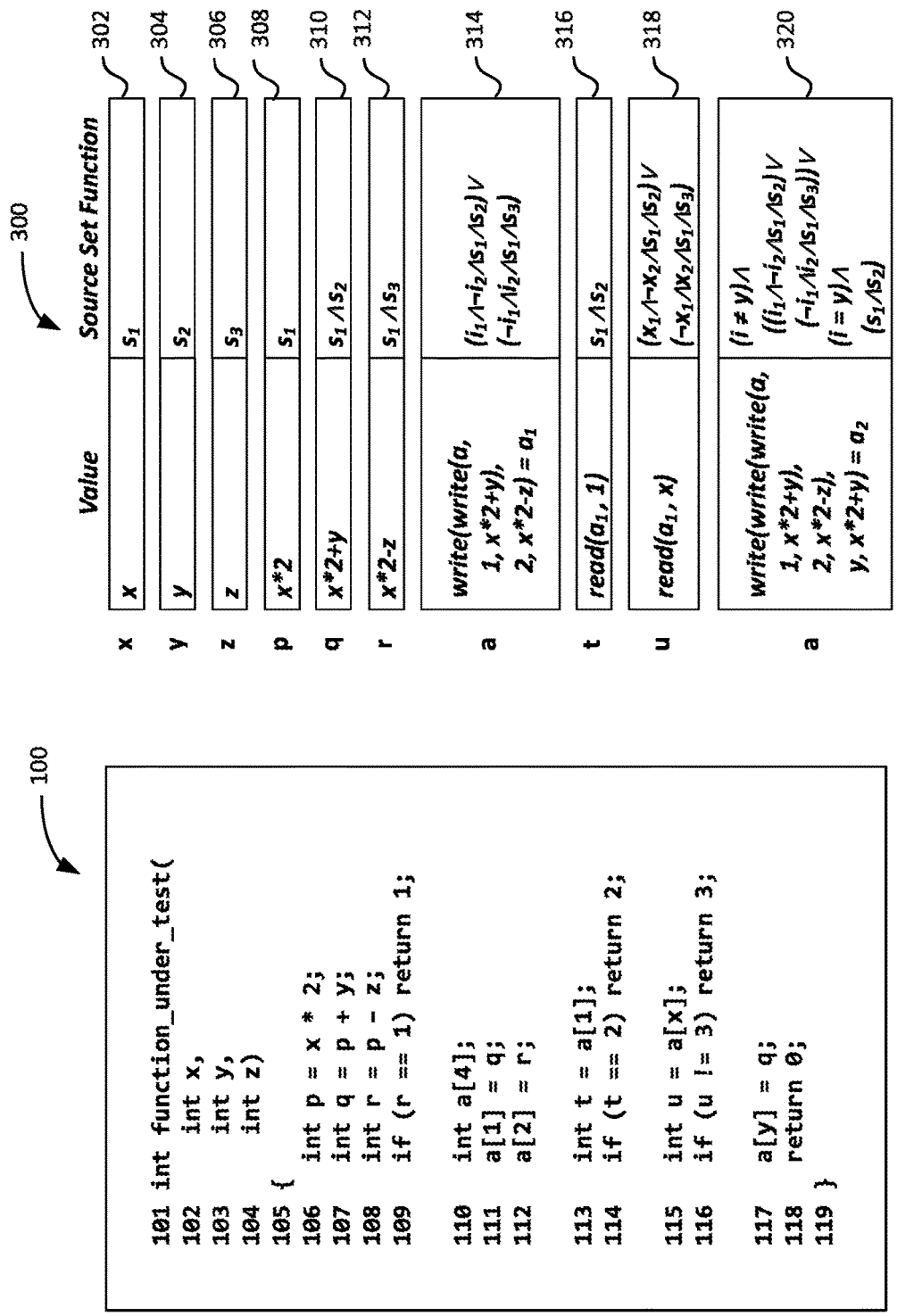
FIG. 3 illustrates the example program of FIG. 1 and a corresponding data structure that includes source sets functions associated with input and program variables.

As used herein: a "data source" or "source" refers to an input variable of a program; a "source set element" is a symbolic variable that is assigned to an input variable of a program; a "data source set" or "source set" is a union of one or more source set elements which together determine a value in an execution path of the program; a symbol "A" denotes a Boolean "AND" operation between one or more Boolean variables; a symbol "V" denotes a Boolean "OR" operation between one or more Boolean variables; a symbol denotes a Boolean complement operation on one or more Boolean variables; and a "source set function" includes one or more Boolean variables related to each other by one or more Boolean operations.

Data source analysis refers to a process of identifying input variables (or their source set elements) that determine a value of a variable. Iterative test generation based on data source analysis of a program may iteratively improve test coverage of the program. However, simple iterative test generation based on data source analysis may utilize an extra data structure which may consume vast amounts of memory and computational time. For example, high space overhead may result from a large number of source sets included in the data structure. The number of source sets included in the data structure may be defined by: O((#value storages)× (#program states)), where "O" refers to "big O notation" which is commonly used in computer science to classify algorithms according to how they respond to changes in input size in terms of their processing time or working space requirements. Value storages may include any storage of a value including input variables, program variables, array variables, and the number of program states may be up to and including the number of paths in the program. Accordingly, the memory size of the program, including the heap and stack memory, may be very large (e.g., 1 MB or larger) with source set sizes for a typical program ranging from 10 to about 100. Likewise, high time overhead may result from a large number of source set manipulations which may be defined as O((#executed instructions)×(#states)), where "O" again refers to "big O notation." Example source set manipulations may include, but are not limited to: union of two or more source sets, equivalence checking of two or more source sets, and inclusion checking of two or more source sets. Moreover, simple iterative test generation based on data source analysis does not support symbolic array indices and a separate source set is associated with each element of an array. Thus, during symbolic execution of an array access instruction utilizing simple iterative test generation, one assumes that any element of the array could be accessed and the entire array is regarded as a scalar by taking a union of all source set elements of the array which may significantly degrade the accuracy of the data source analysis process.

Accordingly, a more sophisticated approach to iterative test generation based on data source analysis may be desired to reduce the space and time overhead associated with this process. In embodiments discussed herein, the space and time overhead may be reduced by representing and manipulating source sets of a data structure by encoding the source sets in Boolean functions and representing the Boolean source set functions in a single diagram or graph. The graphical representation of Boolean source set functions may be accomplished using a binary decision diagram, a reduced ordered binary decision diagram, a shared reduced ordered binary decision diagram, a zero-suppressed decision diagram, a binary moment diagram, a free binary decision diagram, a parity decision diagram, an algebraic decision diagram, or a multiple terminal binary decision diagram. In this manner, source sets may be maximally shared in the single graph to reduce space overhead by sharing common sub-structures between different Boolean functions in the single graph. Furthermore, manipulation of source sets in the single graph may also be more efficient by reducing time overhead. For example, the time overhead associated with equivalence checking of two source sets represented in the single graph may be O(1), as will be discussed in more detail below. Additionally, representing Boolean source set functions in a single graph may allow symbolic array indices to be encoded as Boolean source set functions in the single graph such that data source analysis may not suffer accuracy degradation when array access instructions are symbolically executed.

In the following description, details are set forth by way of example to facilitate discussion of the disclosed subject matter. The disclosed embodiments are provided by way of example only and are not exhaustive of all possible embodiments. Some embodiments will be explained with reference to the accompanying drawings.

FIG. 1 illustrates an example software program 100 (hereinafter "example program" or "program") under test with three versions of a test driver 120, 130, 140 configured to test the program 100. The example program 100 shown in FIG. 1 is defined as a function named "function_under_test" in code line 101. More generally, any program may be tested, including programs that may include one or more classes, procedures, functions, subroutines, modules, code blocks, or the like. The example program 100 is configured to receive input variables x, y, and z, which are defined as integer input variables in code lines 102, 103, and 104. The example program 100 includes various program variables in the main body of the program 100, including p, q, r, a, t, and u which are defined in code lines 106, 107, 108, 110, 113, and 115 respectively. The example program 100 also includes conditional statements found in code lines 109, 114, and 116.

An initial test driver 120 named "test_1" in code line 121 may be formed to test the example program 100 by assigning concrete values to the input variables of the program 100 (x, y, and z) and then evaluating the program 100 to determine whether these initial concrete values are able to trigger all, or a substantial number of, execution paths of the example program 100. In this example, the concrete values selected and assigned to the input variables x, y, and z are "0", as seen in code lines 123, 124, and 125. More generally, any suitable concrete values may be selected and assigned to the input variables in the initial test driver 120.

The program 100 may be tested by the test driver 120 by the function call in code line 126. Each instruction of the example program 100 may be evaluated to determine if the instruction includes a conditional statement. In at least one embodiment, each instruction of the example program 100 may be iteratively evaluated in order by utilizing a program counter (not shown) to analyze a current instruction of the program and incrementing the program counter to analyze a next instruction of the program. If the current instruction includes a conditional statement, the conditional statement may be analyzed to determine whether the conditional statement may be satisfied by the concrete values assigned to the input values. For example, it may be determined that code line 109 includes a conditional statement that is determined by the variable "r". The variable r may be further evaluated using data source analysis to identify which input variables determine the value of r. In this example, r=p−z=x*2−z. Thus, r depends on input variables x and z. However, since x and z are assigned concrete values of zero, r also equals zero and the condition in code line 109 is unable to be satisfied. Accordingly, the initial test driver 120 may be updated or enhanced by making the identified input variables x and z symbolic as shown in code lines 133 and 135 of the second version of the test driver 130, which is named "test_2" in code line 131.

The second version of the test driver 130 may test the program 100 again with symbolic values for x and z and a concrete value of zero for y. Each instruction of the example program 100 may be evaluated to determine if the instruction includes a conditional statement and whether or not the conditional statement may be satisfied by the symbolic and/or concrete values of the input variables. In this iteration, the conditional statement in code line 109 may be satisfied given that x and z are now symbolic. However, the conditional statement in code line 114 depends on the variable "t" and t=a[1]=q=p+y. Thus, t depends on y and the condition in code line 114 is unable to be satisfied. Accordingly, the second version of the test driver 130 may be updated or enhanced by making the identified input variable y symbolic as shown in code line 144 of the third version of the test driver 140, which is named "test_3" in code line 141. The third version of the test driver 140 may test the program again with symbolic values for x, y, and z to determine whether there are any conditional statements that are unable to be satisfied.

In this manner, iterative test generation may be performed on the example program 100 using data source analysis to ensure that all, or a substantial number of, execution paths of the example program 100 may be tested. For example, the third version of the test driver 140 may be capable of testing all of the execution paths in the example program 100.

A simple process of data source analysis will now be explained with reference to FIG. 2 which illustrates the example program 100 of FIG. 1 and a corresponding data structure 200 created during simple data source analysis. The data structure 200 may include source sets 202, 204, 206, 208, 210, 212, 214, 216, 218, 220, 222, 224, 226, 228, 230, and 232 (hereafter "source sets 202-232") which may be respectively associated with variables x, y, z, p, q, r, a, t and u and their associated values as defined in the instructions of the program 100 and written in terms of input variables x, y, and z.

In a first step, code lines 102, 103, and 104 may be read and symbolic source set elements $S_1$, $S_2$, and $S_3$ may be created and assigned to each input variable x, y, and z of the program 100 and stored in respective source sets 202, 204, and 206. Code line 106 may then be read and it may be determined that the program variable "p" depends on input variable x, which is assigned symbolic source set element $S_1$. Thus, $S_1$ may be associated with p and stored in source set 208. Code line 107 may be read next and it may be determined that the program variable "q" depends on input variables x and y, which are assigned symbolic source set elements $S_1$ and $S_2$. Thus, a union of $S_1$ and $S_2$ may be associated with q and stored in source set 210. Code line 108 may be read and it may be determined that the program variable "r" depends on input variables x and z, which are assigned symbolic source set elements $S_1$ and $S_3$. Thus, a union of $S_1$ and $S_3$ may be associated with r and stored in source set 212. Code lines 111 and 112 may be read and it may be determined that these program instructions define array write instructions to write the values of q and r to the second and third elements of array "a" respectively. Thus, a union of $S_1$ and $S_2$ may be associated with the second element of the array "a" and stored in source set 216. Likewise, a union of $S_1$ and $S_3$ may be associated with the third element of the array "a" and stored in source set 218.

At this point in the program execution state, the first array element and the fourth array element have empty source sets 214 and 220. Additionally, each element of the array "a" is associated with a unique source set. Code line 113 may be read and it may be determined that this program instruction defines an array read instruction to access array "a" and store the value of the second array element in variable "t". Thus, a union of $S_1$ and $S_2$ may be associated with t and stored in source set 222. Code line 115 may be read and it may be determined that this program instruction defines an array read instruction to access array "a" and store the value of an element of the array in variable "u". However, since the array index x is symbolic and unknown, it is assumed that any array element may be chosen and assigned to u and a union of $S_1$, $S_2$ and $S_3$ may be associated with u and stored in source set 224. This assumption may degrade the accuracy of the simple data source analysis process. Code line 117 may be read and it may be determined that this instruction defines a symbolic array index write instruction which depends on the symbolic variable y. However, since the array index y is symbolic and unknown, it is assumed that any array element may be chosen and q may be written to the chosen array element. Thus, a union of $S_1$, $S_2$ and $S_3$ may be associated with each array element at this point of the program execution state and stored in source sets 226, 228, 230, and 232. This assumption may also degrade the accuracy of the simple data source analysis process.

The data structure 200 of FIG. 2 illustrates how simple iterative test generation based on data source analysis may consume vast amounts of memory and computational time. For example, large programs with many source sets may consume vast amounts of memory. Likewise, high time overhead may result from a large number of source set manipulations such as union, equivalence checking, and inclusion checking between source sets. Moreover, simple iterative test generation based on data source analysis does not support symbolic array indices. This forces the assumption that any element of the array could be accessed and may lead to significant degradation of data source analysis accuracy.

A more sophisticated process of data source analysis according to at least one embodiment described herein will now be explained with reference to FIG. 3 which illustrates the example program 100 of FIG. 1 and a corresponding data structure 300 created during the more sophisticated data source analysis process.

The data structure 300 may include source set functions 302, 304, 306, 308, 310, 312, 314, 316, 318, and 320 (hereafter "source set functions 302-320") which may be respectively associated with variables x, y, z, p, q, r, a, t and u and their associated values as defined in the instructions of the program 100 and written in terms of input variables x, y, and z. The source set functions 302-320 may be derived from the source sets 202-232 shown in FIG. 2 by encoding the source sets into Boolean functions. For example, Boolean variables $s_1$, $s_2$, and $s_3$, may be assigned to source set elements $S_1$, $S_2$, and $S_3$ respectively, as shown in source set functions 302, 304, and 306. Moreover, Boolean variables of source set functions 302-320 may be related to each other through Boolean "AND" operations to represent a union of two or more source set elements. For example, source set function 310 includes Boolean variables $s_1$ and $s_2$ which are related to each other through a Boolean AND operation as $s_1 \wedge s_2$ and correspond to the union of source set elements $S_1$ and $S_2$ in source set 210 {$S_1$, $S_2$} of FIG. 2. Likewise, source set function 312 includes Boolean variables $s_1$ and $s_3$ which are related with a Boolean AND operation as $s_1 \wedge s_3$ corresponding to the union of source set elements $S_1$ and $S_3$ in source set 212 {$S_1$, $S_3$} of FIG. 2.

In general, if a source set is defined as S={$S_{s1}$, $S_{s2}$, ... $S_{sn}$}, then a Boolean function encoding of the source set into a source set function will be $f(s)=s_{s1} \wedge s_{s2} \wedge \ldots \wedge s_{sn}$, where $s_i$ are Boolean variables which represent respective source set elements $S_i$.

Source set functions may be manipulated with each other. For example, to compute a union of two source sets, one may compute the Boolean AND of their corresponding source set functions as $f=(f_1 \wedge f_2)$. As another example, the inclusion of two source sets may be computed by calculating $(f_1 \wedge \neg f_2)$ and checking to see if this value is false.

Additionally, a single source set function may be associated with an array, rather than unique source sets associated with each element of the array, as seen in the simple data source analysis example above. For example, a source set function for an array may be defined as: $f_A(i, s)$ where i is a vector of Boolean variables $i=(i_1, i_2, \ldots, i_m)$ that encode the array index. For example, suppose we have an array of three elements and the source sets for the array elements are $\{S_1\}$, $\{S_1, S_2\}$, and $\{S_2, S_3\}$. Two Boolean variables, or two bits, $i_1$ and $i_2$ may be used to encode an array index for a three element array. Thus, a source set function for the array may be represented as: $f_A(i, s) = ((i=0) \land s_1) \lor ((i=1) \land s_1 \land s_2) \lor ((i=2) \land s_2 \lor s_3)$, or $f_A(i, s) = (\neg i_1 \neg i_2 \land s_1) \lor (i_1 \land \neg i_2 \land s_1 \land s_2) \lor (\neg i_1 \land i_2 \land s_2 \land s_3)$. Individual source set functions for each array element may be retrieved from the source set function of the array. For example, the source set function for the second array element may be retrieved by assigning $(i_1, i_2)=(1, 0)$ to the source set function which then collapses as $f_A(1, 0, s) = s_1 \land s_2$. In general, the source set function for the $k^{th}$ array element may be computed by $f_A(k, s)$ or $f_A(i, s) = \lor ((i=k) \land f_k(s))$.

The source set function 314 of FIG. 3 illustrates the source set function for the array "a" $(i_1 \land \neg i_2 \land s_1 \land s_2) \lor (\neg i_1 \land i_2 \land s_1 \land s_3)$ which includes two source set functions, one for the second element of the array and one for the third element of the array. The source set functions for each array element are created by computing the Boolean AND of the array index $(i_1, i_2)$ with each source set function of the array, and then the source set function for the entire array is computed by applying a Boolean OR between each source set function of each element of the array.

The source set function 316 of FIG. 3 may be derived from the array source set function 314 by assigning the array index $(i_1, i_2)=(1, 0)$ causing the array source set function 314 to collapse to $s_1 \land s_2$, as previously described above.

The source set function 318 of FIG. 3 may be derived from the array source set function 314 by assigning the array index $(i_1, i_2)=(x_1, x_2)$. Thus, using a symbolic array index to access the array with the more sophisticated data source analysis approach may not result in degradation of data source analysis accuracy, in comparison to the simple data source analysis approach described with respect to FIG. 2.

The source set function 320 of FIG. 3 may be derived from the array source set function 314 by taking the Boolean AND of the array index (i≠y) with the array source set function 314 then taking the Boolean AND of the array index (i=y) with the source set function for "q" $(s_1 \lor s_2)$ and computing the Boolean OR between these two source set functions. In this example, the array index (i≠y) may be translated to $((i_1 \land \neg y_1) \lor (\neg i_1 \land y_1) \lor (i_2 \land \neg y_2) \lor (\neg i_2 \land y_2))$ and the array index (i=y) may be translated to $(((i_1 \land y_1) \lor (\neg i_1 \land \neg y_1)) \land ((i_2 \land y_2) \lor (\neg i_2 \land \neg y_2)))$. Thus, the source set function 320 for the entire array "a" at this point in the program execution state may be defined as: $(i \neq y) \land ((i_1 \land \neg i_2 \land s_1 \land s_2) \lor (\neg i_1 \land i_2 \land s_1 \land s_3)) \lor (i=y) \land (s_1 \land s_2)$.

Figure 4:
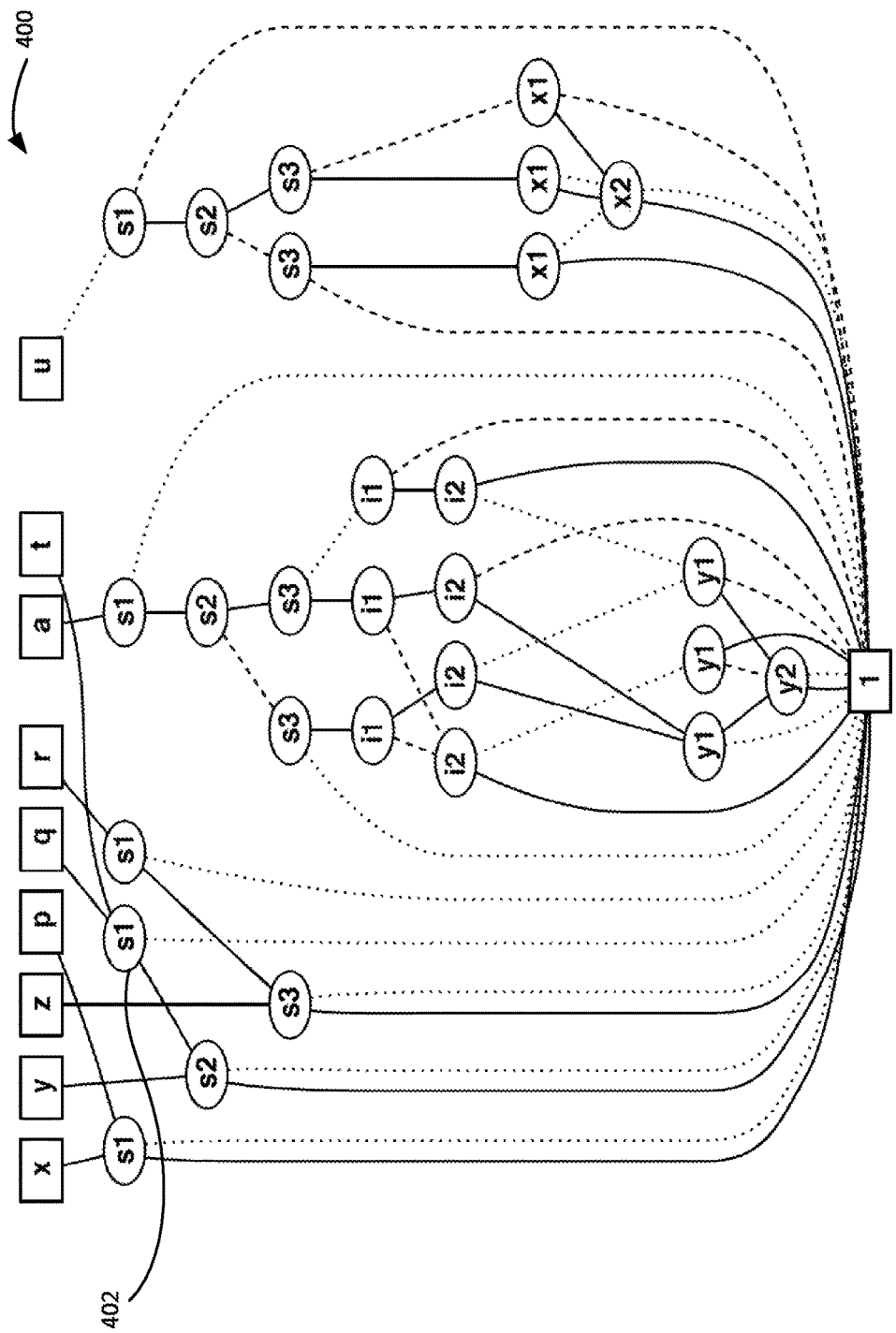
FIG. 4 illustrates a shared reduced ordered binary decision diagram of the data structure of FIG. 3.

The source set functions 302-320 for variables x, y, z, p, q, r, a, t and u may also be represented in a single binary decision diagram graph structure in terms of their respective Boolean variables in order to efficiently represent and manipulate the source set functions. FIG. 4 illustrates one non-limiting example of a shared reduced ordered binary decision diagram (SROBDD) 400 that represents the source set functions 302-320 of FIG. 3. However, graphical representations of the source set functions 302-320 of FIG. 3 or of other source set functions may be accomplished using other graphs including, but not limited to binary decision diagrams, reduced ordered binary decision diagrams, SROBDDs, zero-suppressed decision diagrams, binary moment diagrams, free binary decision diagrams, parity decision diagrams, algebraic decision diagrams, multiple terminal binary decision diagrams, and the like.

The example SROBDD 400 of FIG. 4 may reduce space overhead by allowing different Boolean source set functions to share similar substructures. Furthermore, the SROBDD 400 may also reduce time overhead by simplifying calculations between source set functions. For example, equivalence checking of the source set function "q" and the source set function "t" may be performed in one simple calculation by determining if q and t share the same initial child node. In this case, q and t share the same initial child node 402, and are therefore equivalent to each other.

Figure 5:
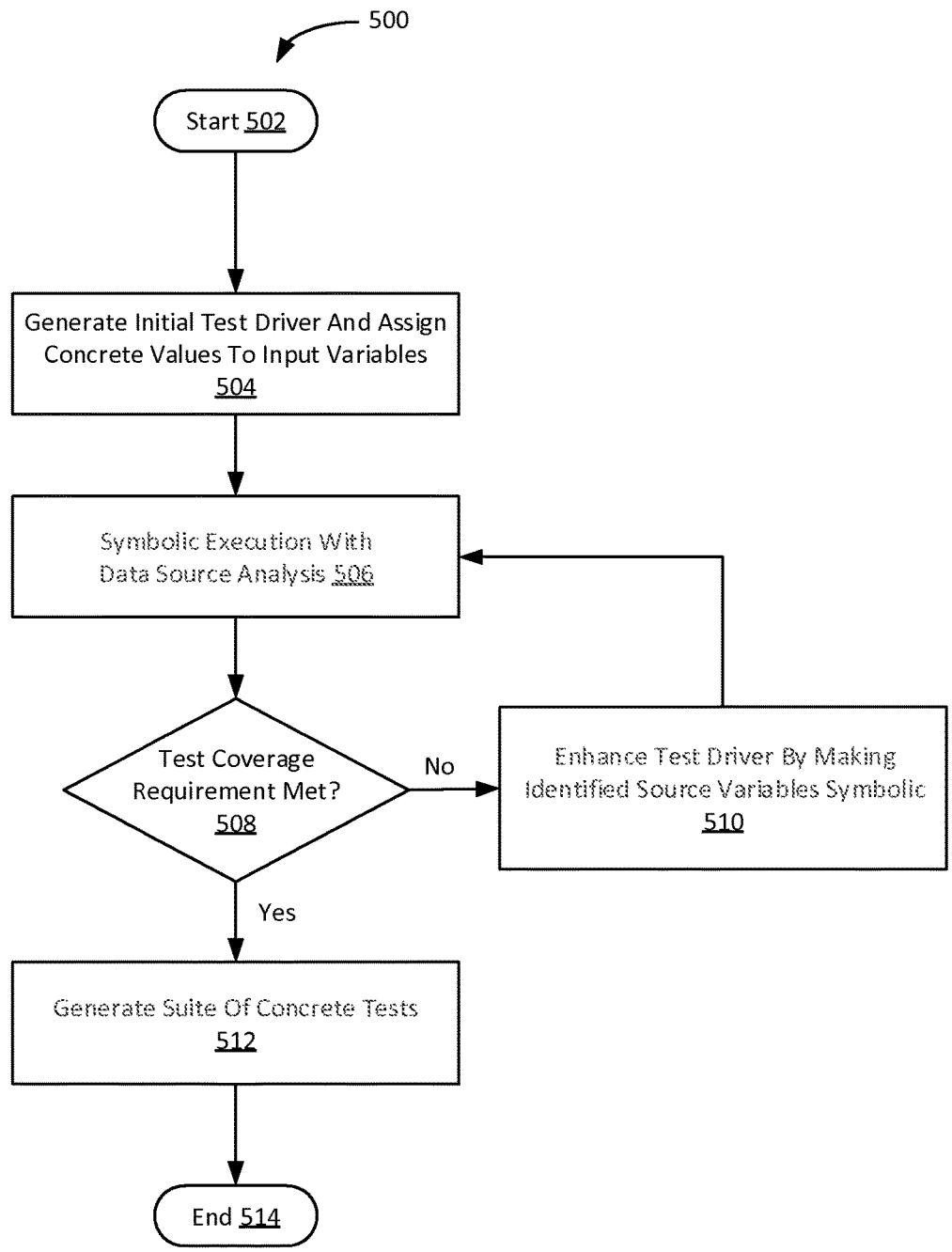
FIG. 5 illustrates a flowchart of an example method of testing a software program.

FIG. 5 illustrates a flowchart of a method 500 of testing a software program (hereafter "program" or "program under test"), arranged in accordance with at least one embodiment described herein. In general, and in some embodiments, the method 500 of testing the program may include iterative test generation, as described herein. The method 500 may be implemented, in whole or in part, by, e.g., a computer or processor. The method 500 may start at block 502 "Start" and end at block 514 "End." Block 502 may be followed by block 504.

In block 504 ("Generate Initial Test Driver And Assign Concrete Values To Input Variables"), an initial test driver may be generated and concrete values may be selected and assigned to input variables of the program under test. Any suitable concrete value may be arbitrarily selected and assigned to the input variables in the initial test driver. Block 504 may be followed by block 506.

In block 506 ("Symbolic Execution With Data Source Analysis"), the initial test driver may be used with symbolic execution and data source analysis to analyze whether or not all, or a substantial number of, program execution paths may be executed based on the concrete values assigned to the input variables of the program. If it is determined that certain program execution paths may not be executed based on the concrete values assigned to the input variables, then the method 500 may enhance the test driver, as will be discussed in more detail with reference to block 510. Block 506 may be followed by block 508.

In block 508 ("Test Coverage Requirement Met?"), the program may be analyzed to determine whether a test coverage requirement has been met. The test coverage requirement may include a predetermined number or percentage of program execution paths that have to be analyzed in order to meet the test coverage requirement. In at least one embodiment, the test coverage requirement may be defined as all program execution paths of the program under test. In other embodiments, the test coverage requirement may be defined as a certain percentage of all program execution paths that have to be analyzed, for example 75%, or some other percentage. In yet other embodiments, the test coverage requirement may be defined by a time limit which may determine how many program execution paths may be executed based on the time limit.

Following block 508, the method 500 may branch depending on whether the test coverage requirement has been met. If it is determined that the test coverage requirement has not been met, ("No" at block 508 in FIG. 5), the method 500 may proceed to block 510. If it is determined that the test coverage requirement has been met, ("Yes" at block 508 in FIG. 5), the method 500 may proceed to block 512.

In block 510 ("Enhance Test Driver By Making Identified Source Variables Symbolic"), and responsive to the determination that the test coverage requirement has not been met, the test driver may be enhanced by identifying certain input variables and enhancing the test driver by making these input variables symbolic. For example, a conditional statement of the program may depend on certain input variables which have to have certain values in order to make the conditional statement true and execute the program path or paths pertaining to the conditional statement. Data source analysis may be utilized to find the input variables that control the conditional statement and these input variables may be made symbolic in an enhanced test driver. Block 510 may be followed by block 506 for iteration.

In block 512 ("Generate Suite Of Concrete Tests"), and responsive to the determination that the test coverage requirement has been met, a suite of concrete tests may be generated to test the program. Block 512 may be followed by block 514 "End" where the method 500 may end.

Some embodiments described herein include a non-transitory computer-readable medium that includes computer-readable instructions stored thereon. The instructions may be executable by a processor to perform or control performance of the method 500 of FIG. 5.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed implementations.

Figure 6:
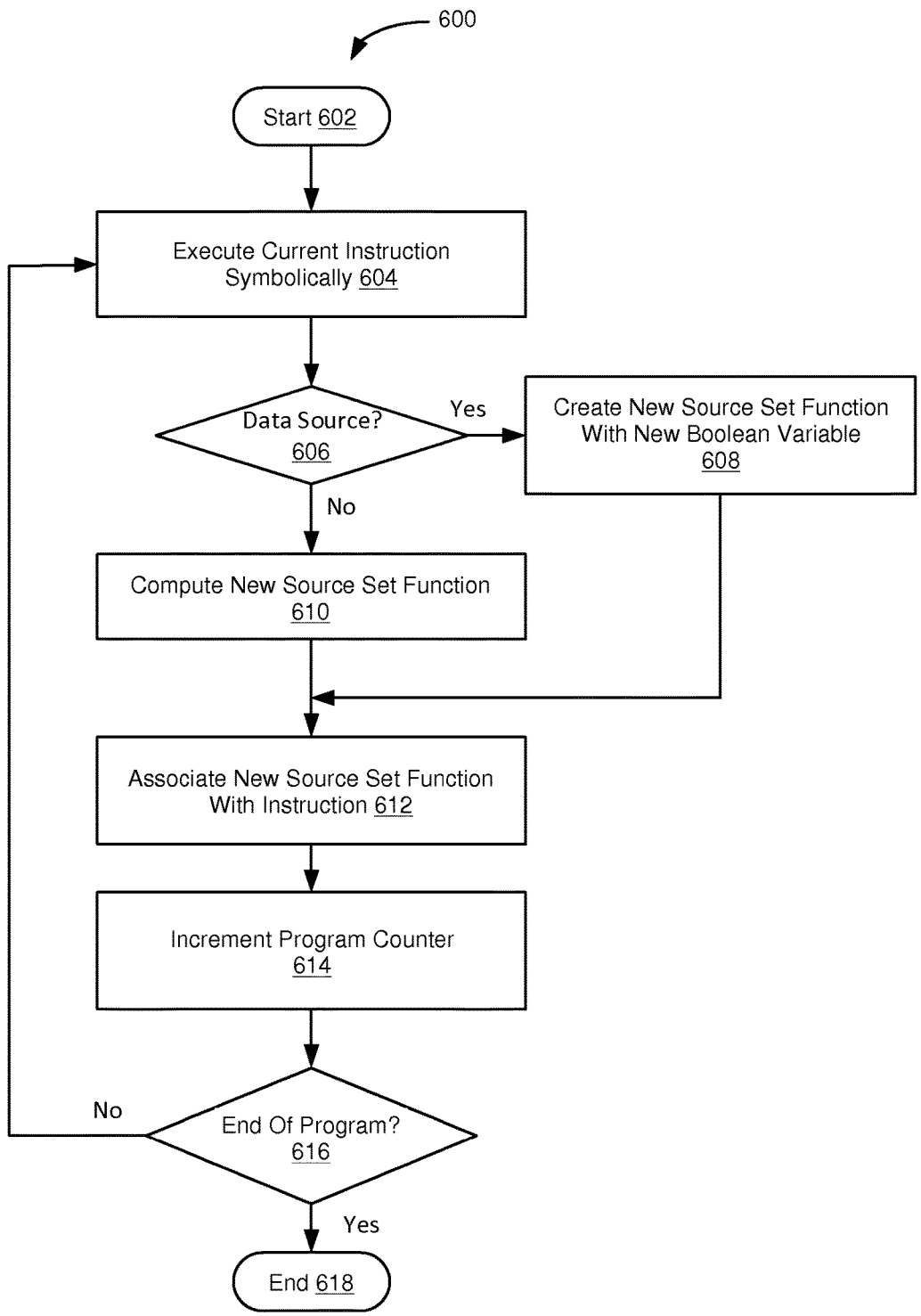
FIG. 6 illustrates a flowchart of an example method of symbolic execution with data source analysis.

FIG. 6 illustrates a flowchart of an example method 600 of symbolic execution with data source analysis, arranged in accordance with at least one embodiment described herein. In at least one embodiment, the method 600 may correspond to block 506 ("Symbolic Execution With Data Source Analysis") of FIG. 5. The method 600 may be implemented, in whole or in part, by, e.g., a computer or processor. The method 600 may start at block 602 "Start" and end at block 618 "End." Block 602 may be followed by block 604.

In block 604 ("Execute Current Instruction Symbolically"), a current instruction of the program may be executed symbolically based on the symbolic source set elements assigned to the input variables of the program. Block 604 may be followed by block 606.

In block 606 ("Data Source?"), the current instruction may be analyzed to determine whether the current instruction defines a data source (e.g., an input variable). Following block 606, the method 600 may branch depending on whether the current instruction defines a data source. If it is determined that the current instruction defines a data source ("Yes" at block 606 in FIG. 6), the method 600 may proceed to block 608. If it is determined that the current instruction does not define a data source ("No" at block 606 in FIG. 6), the method 600 may proceed to block 610.

In block 608 ("Create New Source Set Function With New Boolean Variable"), and responsive to the determination that the current instruction defines a data source, a new source set function may be created for the current instruction by creating a new Boolean variable for the data source. Block 608 may be followed by block 612.

In block 610 ("Compute New Source Set Function"), and responsive to the determination that the current instruction does not define a data source, a new source set function may be created for the current instruction by identifying the one or more Boolean variables that pertain to the new source set function and defining the Boolean operations between the one or more Boolean variables. Block 610 may be followed by block 612.

In block 612 ("Associate New Source Set Function With Instruction"), the new source set function may be associated with the instruction from which it was derived. Block 612 may be followed by block 614.

In block 614 ("Increment Program Counter"), a program counter may be incremented and a current instruction pointer may move to a next instruction in the program for analysis. Block 614 may be followed by block 616.

In block 616 ("End Of Program?"), the program may be analyzed to determine whether the end of the program has been reached. Following block 616, the method 600 may branch depending on whether the end of the program has been reached. If it is determined that the end of the program has not been reached ("No" at block 616 in FIG. 6), the method 600 may proceed to block 604 for iteration. If it is determined that the end of the program has been reached ("Yes" at block 616 in FIG. 6), the method 600 may proceed to block 618 "End" where the method 600 may end and, in at least one embodiment, continue at block 508 of method 500.

Some embodiments described herein include a non-transitory computer-readable medium that includes computer-readable instructions stored thereon. The instructions may be executable by a processor to perform or control performance of the method 600 of FIG. 6.

Figure 7:
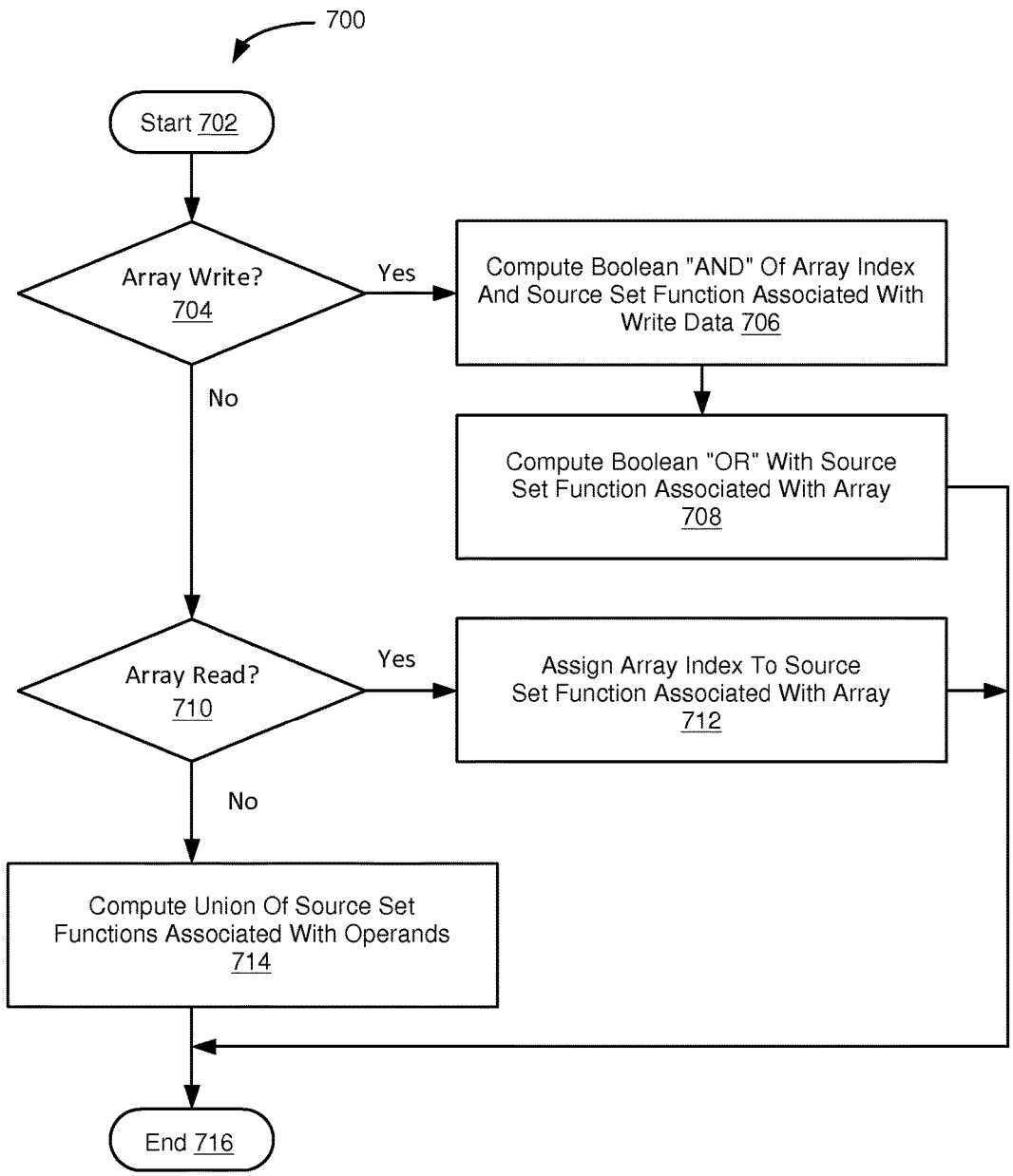
FIG. 7 illustrates a flowchart of an example method of source set function computation.

FIG. 7 shows an example flow diagram of a method 700 of source set function computation, arranged in accordance with at least one embodiment described herein. In at least one embodiment, the method 700 may correspond to block 610 ("Compute New Source Set Function") of FIG. 6. The method 700 may be implemented, in whole or in part, by, e.g., a computer or processor. The method 700 may start at block 702 "Start" and may end at block 716 "End." Block 702 may be followed by block 704.

In block 704 ("Array Write?"), the current instruction may be analyzed to determine whether the current instruction defines an array write instruction. Following block 704, the method 700 may branch depending on whether the current instruction defines an array write instruction. If it is determined that the current instruction defines an array write instruction ("Yes" at block 704 in FIG. 7), the method 700 may proceed to block 706. If it is determined that the current instruction does not define an array write instruction ("No" at block 704 in FIG. 7), the method 700 may proceed to block 710.

In block 706 ("Compute Boolean "AND" Of Array Index And Source Set Function Associated With Write Data"), and responsive to the determination that the current instruction defines an array write instruction, the Boolean AND of the array index and the source set function for each element of the array may be computed. Block 706 may be followed by block 708.

In block 708 ("Compute Boolean "OR" With Source Set Function Associated With Array"), the Boolean OR of each source set function for each element of the array may be computed to complete the array source set function. Block 708 may be followed by block 716 "End" where the method 700 may end and, in at least one embodiment, continue at block 612 of method 600.

In block 710 ("Array Read?"), and responsive to the determination that the current instruction does not define an array write instruction, the current instruction may be analyzed to determine whether the current instruction defines an array read instruction. Following block 710, the method 700 may branch depending on whether the current instruction defines an array read instruction. If it is determined that the current instruction defines an array read instruction ("Yes" at block 710 in FIG. 7), the method 700 may proceed to block 712. If it is determined that the current instruction does not define an array read instruction ("No" at block 710 in FIG. 7), the method 700 may proceed to block 714.

In block 712 ("Assign Array Index To Source Set Function Associated With Array"), and responsive to the determination that the current instruction defines an array read instruction, the array index may be assigned to the array source set function. If the array index is assigned concrete values, then the array source set function may collapse and a single source set function for one element of the array may result. If the array index is assigned symbolic variables, then the symbolic variables may replace the Boolean array index variables in the array source set function. Block 712 may be followed by block 716 "End" where the method 700 may end and, in at least one embodiment, continue at block 612 of method 600.

In block 714 ("Compute Union Of Source Set Functions Associated With Operands"), and responsive to the determination that the current instruction does not define an array read or write instruction, but defines a non-array instruction, a union of source set functions may be computed by applying a Boolean AND operation between Boolean variables associated with the operands of the current instruction. Block 714 may be followed by block 716 "End" where the method 700 may end and, in at least one embodiment, continue at block 612 of method 600.

Some embodiments described herein include a non-transitory computer-readable medium that includes computer-readable instructions stored thereon. The instructions may be executable by a processor to perform or control performance of the method 700 of FIG. 7.

Figure 8:
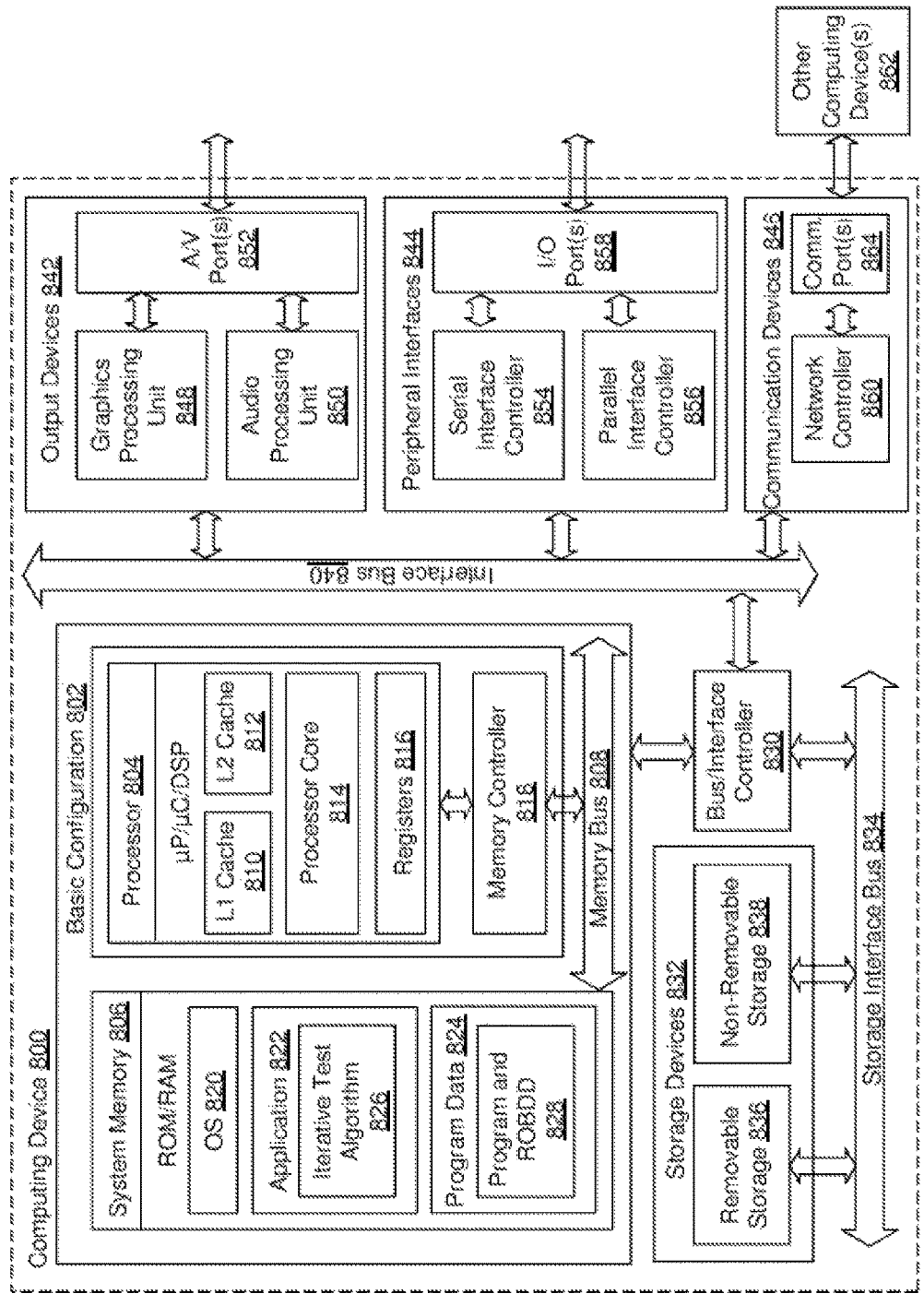
FIG. 8 is a block diagram illustrating an example computing device that is arranged for iterative test generation based on data source analysis.

FIG. 8 is a block diagram illustrating an example computing device 800 that is arranged for iterative test generation based on data source analysis, arranged in accordance with at least some embodiments described herein. In a basic configuration 802, the computing device 800 typically includes one or more processors 804 and a system memory 806. A memory bus 808 may be used for communicating between the processor 804 and the system memory 806.

Depending on the desired configuration, the processor 804 may be of any type including, but not limited to, a microprocessor (μP), a microcontroller (μC), a digital signal processor (DSP), or any combination thereof. The processor 804 may include one or more levels of caching, such as a level one cache 810 and a level two cache 812, a processor core 814, and registers 816. The processor core 814 may include an arithmetic logic unit (ALU), a floating point unit (FPU), a digital signal processing core (DSP Core), or any combination thereof. An example memory controller 818 may also be used with the processor 804, or in some implementations the memory controller 818 may be an internal part of the processor 804.

Depending on the desired configuration, the system memory 806 may be of any type including, but not limited to, volatile memory (such as RAM), nonvolatile memory (such as ROM, flash memory, etc.), or any combination thereof. The system memory 806 may include an operating system 820, one or more applications 822, and program data 824. The application 822 may include an iterative test algorithm 826 that is arranged to perform iterative test generation. The program data 824 may include a program under test and an associated ROBDD 828 ("Program and ROBDD 828" in FIG. 8) or other single binary decision diagram graph structure associated with the program under test as is described herein. In some embodiments, the application 822 may be arranged to operate with the program data 824 on the operating system 820 such that the methods 500, 600, and 700 of FIGS. 5-7 may be provided as described herein.

The computing device 800 may have additional features or functionality, and additional interfaces to facilitate communications between the basic configuration 802 and any involved devices and interfaces. For example, a bus/interface controller 830 may be used to facilitate communications between the basic configuration 802 and one or more data storage devices 832 via a storage interface bus 834. The data storage devices 832 may be removable storage devices 836, non-removable storage devices 838, or a combination thereof. Examples of removable storage and non-removable storage devices include magnetic disk devices such as flexible disk drives and hard-disk drives (HDDs), optical disk drives such as compact disk (CD) drives or digital versatile disk (DVD) drives, solid state drives (SSDs), and tape drives to name a few. Example computer storage media may include volatile and nonvolatile, removable and non-removable media implemented in any method or technology for storage of information, such as computer-readable instructions, data structures, program modules, or other data.

The system memory 806, the removable storage devices 836, and the non-removable storage devices 838 are examples of computer storage media or non-transitory computer-readable media. Computer storage media or non-transitory computer-readable media includes RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by the computing device 800. Any such computer storage media or non-transitory computer-readable media may be part of the computing device 800.

The computing device 800 may also include an interface bus 840 for facilitating communication from various interface devices (e.g., output devices 842, peripheral interfaces 844, and communication devices 846) to the basic configuration 802 via the bus/interface controller 830. The output devices 842 include a graphics processing unit 848 and an audio processing unit 850, which may be configured to communicate to various external devices such as a display or speakers via one or more A/V ports 852. The peripheral interfaces 844 include a serial interface controller 854 or a parallel interface controller 856, which may be configured to communicate with external devices such as input devices (e.g., keyboard, mouse, pen, voice input device, touch input device, etc.), sensors, or other peripheral devices (e.g., printer, scanner, etc.) via one or more I/O ports 858. The communication devices 846 include a network controller 860, which may be arranged to facilitate communications with one or more other computing devices 862 over a network communication link via one or more communication ports 864.

The network communication link may be one example of a communication media. Communication media may typically be embodied by computer-readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR), and other wireless media. The term "computer-readable media" as used herein may include both storage media and communication media.

The computing device 800 may be implemented as a portion of a small-form factor portable (or mobile) electronic device such as a smartphone, a personal data assistant (PDA), or an application-specific device. The computing device 800 may also be implemented as a personal computer including both laptop computer and non-laptop computer configurations, or a server computer including both rack-mounted server computer and blade server computer configurations.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, various changes, substitutions, and alterations could be made hereto without departing from the spirit and scope of the invention.

What is claimed is:

1. A method of testing a software program, the method comprising:
    generating a test driver by assigning concrete values to input variables of the software program;
    assigning symbolic source set elements to the input variables of the software program;
    generating source set functions, the source set functions representing a relationship between value storages of the software program and the symbolic source set elements, the source set functions comprising Boolean variables representing the symbolic source set elements, and Boolean operators describing a relationship between the Boolean variables;
    symbolically executing, with data source analysis, a current instruction of the software program based on the concrete values and symbolic source set elements assigned to the input variables of the software program; and
    based on the symbolic execution with data source analysis, determining whether the software program meets one or more predetermined requirements;
    wherein the Boolean variables of the source set functions are first Boolean variables and the Boolean operators of the source set functions are first Boolean operators, and wherein the generating source set functions includes generating an array source set function, the array source set function representing a relationship between values in an array variable of the software program and the symbolic source set elements, the array source set function comprising the first Boolean variables representing the symbolic source set elements, second Boolean variables representing indices of the array variable, and second Boolean operators describing a relationship between the first Boolean variables and the second Boolean variables.

2. The method of claim 1, wherein the source set functions comprise source sets including a union between one or more of the symbolic source set elements.

3. The method of claim 1, wherein one or more of the source set functions are graphically represented in a diagram.

4. The method of claim 3, wherein the diagram is a single diagram comprising one of a binary decision diagram, a reduced ordered binary decision diagram, a shared reduced ordered binary decision diagram, a zero-suppressed decision diagram, a binary moment diagram, a free binary decision diagram, a parity decision diagram, an algebraic decision diagram, or a multiple terminal binary decision diagram.

5. A method of testing a software program, the method comprising:
    generating a test driver by assigning concrete values to input variables of the software program;
    assigning symbolic source set elements to the input variables of the software program to generate a data structure based on the symbolic source set elements;
    symbolically executing, with data source analysis, a current instruction of the software program based on the concrete values and symbolic source set elements assigned to the input variables of the software program, including assigning a Boolean variable to each symbolic source set element to create source set functions for each input variable, the source set functions including Boolean operators describing a relationship between the Boolean variables: and
    based on the symbolic execution with data source analysis, determining whether the software program meets one or more predetermined requirements;
    wherein the Boolean variables of the source set functions are first Boolean variables and the Boolean operators of the source set functions are first Boolean operators, and wherein the generating source set functions includes generating an array source set function, the array source set function representing a relationship between values in an array variable of the software program and the symbolic source set elements, the array source set function comprising the first Boolean variables representing the symbolic source set elements, second Boolean variables representing indices of the array variable, and second Boolean operators describing a relationship between the first Boolean variables and the second Boolean variables.

6. The method of claim 5, wherein the symbolically executing further includes computing a source set function for the current instruction.

7. The method of claim 6, wherein the current instruction comprises a non-array instruction and the computing a source set function for the current instruction comprises computing a union of the source set functions associated with operands of the current instruction.

8. The method of claim 6, wherein the current instruction comprises an array write instruction to write data associated with a source set function to an array having an array index and the computing a source set function for the current instruction comprises:
    computing a Boolean "AND" operation between Boolean variables representing the array index with the Boolean variables of the source set function associated with the write data; and
    computing a Boolean "OR" operation between source set functions associated with each element of the array.

9. The method of claim 6, wherein the current instruction comprises an array write instruction to write data associated with a source set function to an array with a symbolic array index and the computing a source set function for the current instruction comprises:
    computing a Boolean "AND" operation of the symbolic array index and the source set function of the array; and computing a Boolean "OR" operation between source set functions associated with each element of the array.

10. The method of claim 6, wherein the current instruction comprises an array read instruction to read data from an array having an array index and the computing a source set function for the current instruction comprises assigning concrete values to the array index of the source set function associated with the array.

11. The method of claim 6, wherein the current instruction comprises an array read instruction to read data from the array variable by symbolic array index and the computing a source set function for the current instruction comprises assigning Boolean variables associated with the symbolic array index to Boolean variables associated with the indices of the array variable.

12. The method of claim 5, further comprising determining whether the current instruction includes a conditional statement that is unable to be satisfied based on the concrete values assigned to the input variables of the software program.

13. The method of claim 12, further comprising:
in response to determining that the current instruction includes the conditional statement that is unable to be satisfied based on the concrete values assigned to the input variables of the software program, determining whether a test coverage requirement for the software program has been met; and
in response to determining that the test coverage requirement has not been met, identifying input variables that control the conditional statement and enhancing the test driver by making the identified input variables symbolic.

14. The method of claim 13, further comprising:
in response to determining that the test coverage requirement for the software program has been met, generating a suite of concrete tests for the software program.

15. The method of claim 5, wherein the data structure is graphically represented in a single diagram comprising one of a binary decision diagram, a reduced ordered binary decision diagram, a shared reduced ordered binary decision diagram, a zero-suppressed decision diagram, a binary moment diagram, a free binary decision diagram, a parity decision diagram, an algebraic decision diagram, or a multiple terminal binary decision diagram.

16. A non-transitory computer-readable medium that includes computer-readable instructions stored thereon that are executable by a processor to perform or control performance of operations comprising:
generating a test driver by assigning concrete values to input variables of a software program;
assigning symbolic source set elements to the input variables of the software program;
generating source set functions, the source set functions representing a relationship between value storages of the software program and the symbolic source set elements, the source set functions comprising Boolean variables representing the symbolic source set elements, and Boolean operators describing a relationship between the Boolean variables;
symbolically executing, with data source analysis, a current instruction of the software program based on the concrete values and symbolic source set elements assigned to the input variables of the software program; and
based on the symbolic execution with data source analysis, determining whether the software program meets one or more predetermined requirements;
wherein the Boolean variables of the source set functions are first Boolean variables and the Boolean operators of the source set functions are first Boolean operators, and wherein the generating source set functions includes generating an array source set function, the array source set function representing a relationship between values in an array variable of the software program and the symbolic source set elements, the array source set function comprising the first Boolean variables representing the symbolic source set elements, second Boolean variables representing indices of the array variable, and second Boolean operators describing a relationship between the first Boolean variables and the second Boolean variables.

17. The non-transitory computer-readable medium of claim 16, wherein the source set functions comprise:
source sets including a union between one or more of the symbolic source set elements;
source set functions created by encoding the source sets into Boolean functions, the Boolean functions comprising Boolean variables representing the symbolic source set elements; and
an array source set function comprising Boolean variables representing the symbolic source set elements of the array source set function and Boolean variables representing indices of the array source set function.

18. The non-transitory computer-readable medium of claim 16, wherein one or more of the source set functions are graphically represented in a single diagram comprising one of a binary decision diagram, a reduced ordered binary decision diagram, a shared reduced ordered binary decision diagram, a zero-suppressed decision diagram, a binary moment diagram, a free binary decision diagram, a parity decision diagram, an algebraic decision diagram, or a multiple terminal binary decision diagram.

19. The method of claim 1, further comprising generating source sets representing a relationship between value storages of the software program and the symbolic source set elements.

* * * * *